United States Patent Office 2,730,513
Patented Jan. 10, 1956

2,730,513
PLASTICISED COMPOSITIONS

Eric John Gray Balley, Welwyn Garden City, and Wilfred Walker, Cleveleys, England, assignors to Imperial Chemical Industries Limited, a corporation of Great Britain No Drawing. Application December 13, 1951,
Serial No. 261,610

Claims priority, application Great Britain
December 22, 1950

1 Claim. (Cl. 260—31.8)

This invention relates to compositions containing one or more organic thermoplastic materials and one or more plasticisers therefor.

A wide variety of plasticisers have been proposed for incorporation into compositions comprising organic thermoplastic materials, particularly numerous esters such as certain phthalates, phosphates, adipates, sebacates, glycollates and citrates. The choice of plasticiser to be used depends primarily upon the particular thermoplastic material to be plasticised and the use to which the resultant composition is to be put. The plasticiser must be sufficiently compatible with the organic thermoplastic material and should be undissolved and stable in the presence of any substances with which the composition is likely to come into contact. Furthermore, the plasticiser should be retained in the composition under a wide variety of conditions.

The nature and proportion of plasticiser used in a given composition will affect the physical properties of the composition, for example, the flexibility, electrical resistivity, softening point and toughness, and to some extent the chemical properties such as stability and inflammability. Whilst for most purposes it is usually possible to select a suitable plasticiser from those already known, for some applications known plasticisers are not completely satisfactory and it is usually necessary to compromise between a number of different plasticisers for a particular purpose, consideration being given to physical properties, availability and cost.

An object of this invention is to provide new compositions of matter comprising organic thermoplastic materials and plasticisers therefor. Another object of the invention is to provide such plasticised compositions comprising polymers of vinyl chloride or copolymers thereof. A further object of the invention is to provide plasticised compositions of polymers of vinyl chloride or copolymers thereof which are well suited for such applications as sheathing for cables, calendering and general extrusion purposes.

According to the present invention these objects are accomplished by a composition comprising at least one organic thermoplastic material and a plasticiser, said plasticiser comprising a mixture of neutral esters as hereinafter defined, derived from at least one polybasic acid and the mixture of at least one straight chain primary alcohol containing from 6 to 10 carbon atoms per molecule and at least one 2-methyl substituted primary alcohol containing from 6 to 10 carbon atoms per molecule having the general formula

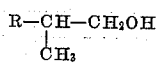

wherein R is a straight chain alkyl group.

Further, in accordance with the present invention, compositions particularly well suited for such applications as sheathing for cables, calendering and extrusion, comprise polyvinyl chloride and the mixture of neutral esters as hereinafter defined, especially the phthalates, derived from at least one polybasic acid and the mixture of alcohols comprising mixed straight chain alcohols containing from 7 to 9 carbon atoms per molecule in major proportion and mixed 2-methyl substituted primary alcohols containing from 7 to 9 carbon atoms per molecule in major proportion, said 2-methyl substituted primary alcohols having the general formula

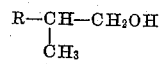

wherein R is a straight chain alkyl group, said mixture of alcohols being obtained by carbonylating a mixture comprising straight chain α-olefines containing from 6 to 8 carbon atoms per molecule in major proportion and thereafter hydrogenating the carbonylation product.

It is to be understood that the methyl group of the said 2-methyl substituted primary alcohols is attached to the carbon atom adjacent to that to which the hydroxyl group is attached.

By the term, neutral ester, as used throughout this specification, we mean the ester obtained by the esterification of all the carboxyl groups of a polybasic acid by one or more alcohols.

The alcohols from which the neutral esters are derived are most conveniently prepared from mixtures of straight chain α-olefines containing from 5 to 9 carbon atoms per molecule in major proportion, by carbonylating the mixed α-olefines with mixed carbon monoxide and hydrogen in the liquid phase in the presence of dissolved cobalt salts, e. g. the naphthenate or acetate, and thereafter hydrogenating with, for example, a nickel or copper catalyst. Suitable methods are described in copending S. N. 258,751, filed November 28, 1951, S. N. 258,752, filed November 28, 1951, S. N. 180,706, filed August 21, 1950, and Patent No. 2,694,091. The products of these methods from a particular straight chain α-olefine are mixtures of a straight chain primary alcohol and a 2-methyl substituted primary alcohol, each containing one more carbon atom than the α-olefine from which they are derived, the straight chain primary alcohol being in major proportion.

The neutral esters may be prepared from the mixtures of straight chain alcohols and 2-methyl substituted primary alcohols by known methods, for example by heating the mixed alcohols with approximately the stoichiometric proportion of the appropriate polybasic acid, preferably in the presence of a minor proportion of an acid catalyst such as sulphuric acid, and in the substantial absence of water. This is conveniently achieved by having a water entraining agent such as toluene present and carrying out the esterification under reflux. Particularly suitable methods are described in copending S. N. 148,744, filed March 28, 1949, S. N. 179,376, filed August 14, 1950, and S. N. 197,522, filed November 24, 1950.

Our preferred neutral esters are those derived from mixtures of alcohols comprising mixed straight chain primary alcohols and mixed 2-methyl substituted primary alcohols having from 7 to 9 carbon atoms per molecule in major proportion, and our preferred mixture of such alcohols is one having the composition:

| | Per cent by volume |
|---|---|
| C₇ alcohols | 40–50 |
| C₈ alcohols | 50–40 |
| C₉ alcohols | 10–15 | since neutral esters derived from such a mixture then have a particularly useful combination of mobility and lack of volatility.

We prefer that in the preparation of the neutral esters suitable acids should be selected so that the neutral ester formed therefrom has a boiling point greater than 300° C. at normal pressure. Among the polybasic acids which are suitable for this purpose are, for example, aconitic, adipic, citric, phthalic, succinic, tartaric, tricarballylic and orthophosphoric acids. The preferred acids are phthalic and adipic.

The organic thermoplastic material or materials with which these esters may be used as plasticisers, may consist of one or more natural or synthetic resins, including, for example cellulose derivatives such as cellulose nitrate, cellulose acetate, cellulose acetobutyrate, cellulose acetopropionate, ethyl cellulose and benzyl cellulose, polymers and interpolymers of compounds containing the vinylidene group (that is the group $CH_2=C<$), such as vinyl chloride, vinyl acetate, vinylidene chloride and acrylic acid derivatives, for example, methyl methacrylate and acrylonitrile, certain derivatives of some of these polymers and interpolymers, such as acetals of hydrolysed polyvinyl ester derivatives, especially butyrals, halogenated solid polymers of ethylene, and synthetic rubbers such as neoprenes and butadiene copolymers with styrene or acrylonitrile. The plasticisers of this invention are of particular value when the organic thermoplastic material used in the compositions of the present invention is a polymer or copolymer of vinyl chloride.

The compositions of this invention may be in the form of solid moulding materials, pastes, lacquers, solutions or dispersions. The relative amounts of the thermoplastic materials and said neutral esters used in forming these compositions may be varied within wide limits according to the particular properties required. In general the amounts are similar to those used conventionally with other plasticisers. Thus proportions of plasticiser in polyvinyl chloride compositions of from about 10 to 60% by weight, for example, are suitable for most purposes.

In addition to the organic thermoplastic materials and the said neutral esters other ingredients may be present in the compositions if desired, for example, other plasticisers, plasticiser extenders such as chlorinated paraffin waxes, stabilisers, fillers and colouring materials. Thus with vinyl chloride polymers and interpolymers it is often desirable to include a substance which acts as a heat-stabiliser, and any heat-stabilisers for vinyl chloride polymers and interpolymers may be used in the said compositions.

Compositions of the present invention are suitable for all applications of previously known thermoplastic resin/plasticiser compositions, including, for example, moulding, extrusion, cable covering, coating applications such as in the manufacture of leathercloth, and the production of hollow articles.

Plasticised compositions of our invention comprising polyvinyl chloride are particularly well suited for general purpose extrusion applications, including the production of sheathing for cables, and for calendering in the production of textile substitute sheets.

The invention is illustrated but in no way limited by the following examples, in which all parts are by weight.

In the following examples, the neutral esters used were derived from the mixture of alcohols produced by the method described in copending S. N. 258,751, filed November 28, 1950, from the mixture of straight chain α-olefines having the composition:

| | Per cent |
|---|---|
| $C_6$ olefines | 45 |
| $C_7$ olefines | 45 |
| $C_8$ olefines | 10 |

The diphthalate was prepared by esterifying phthalic anhydride with the mixture of alcohols by the method described in copending application No. 23,513/49, and the di-adipate was similarly prepared by esterifying adipic acid with the mixture of alcohols.

Example I 50 parts of the phthalate ester, as hereinbefore described, were compounded with 100 parts of polyvinyl chloride. The composition gave excellent products when calendered or extruded, and had the following properties:

| | |
|---|---|
| B. S. hardness at 20° C | 36 |
| Tensile strength in lb./sq. in. at 20° C | 2700 |
| Per cent elongation at break at 20° C | 270 |
| Volume resistivity in ohm. cm. at 20° C | $9.5 \times 10^{12}$ |
| Loss on heating for 5 days at 82.2° C | 0.9% |

Example II 70 parts of the phthalate ester, as hereinbefore described, were compounded with 100 parts of polyvinyl chloride. The composition was somewhat similar to that of Example I and had the following properties:

| | |
|---|---|
| B. S. hardness at 20° C | 59 |
| Tensile strength in lb./sq. in. at 20° C | 2050 |
| Percent elongation at break at 20° C | 365 |
| Volume resistivity in ohm. cm. at 20° C | $7.6 \times 10^{11}$ |

Example III 100 parts of phthalate ester as hereinbefore described, were compounded with 100 parts of polyvinyl chloride. The composition gave excellent products when extruded, and had the following properties:

| | |
|---|---|
| B. S. hardness at 20° C | 92 |
| Tensile strength in lb./sq. in. at 20° C | 1250 |
| Percent elongation at break at 20° C | 360 |
| Volume resistivity in ohm. cm. at 20° C | $9.8 \times 10^{10}$ |

Example IV 50 parts of the adipate ester, as hereinbefore described, were compounded with 100 parts of polyvinyl chloride. The composition gave excellent properties when calendered or extruded and had the following properties:

| | |
|---|---|
| B. S. hardness at 20° C | 43 |
| Tensile strength in lb./sq. in. at 20° C | 2500 |
| Percent elongation at break at 20° C | 320 |
| Volume resistivity in ohm. cm. at 20° C | $1.5 \times 10^{11}$ |
| Low temperature flexibility test | −55–60° C. |
| Heat stability (minutes at 180° C.) | >420 |

We claim:

Compositions adapted for cable sheathing, calendering and extrusion comprising polyvinyl chloride plasticized with a plasticizer consisting essentially of the diesters of at least one polybasic acid and a mixture of (1) mixed straight chain primary alcohols and (2) mixed 2-methyl substituted primary alcohols both of said alcohols having 7, 8 and 9 carbon atoms per molecule in major proportion, said alcohols being present together in the relative proportions by volume respectively of 40 to 50% $C_7$ alcohols, 50 to 40% of $C_8$ alcohols, and 10 to 15% of $C_9$ alcohols.

References Cited in the file of this patent

UNITED STATES PATENTS

| | | |
|---|---|---|
| 2,015,077 | Lawson | Sept. 24, 1935 |
| 2,015,088 | Reid | Sept. 24, 1935 |
| 2,625,527 | Smith et al. | Jan. 13, 1953 |